(12) United States Patent
Litteaut et al.

(10) Patent No.: US 8,571,196 B2
(45) Date of Patent: Oct. 29, 2013

(54) METHOD FOR RETRIEVING INFORMATION FROM A TELEPHONE TERMINAL VIA A COMMUNICATION SERVER, AND ASSOCIATED COMMUNICATION SERVER

(75) Inventors: Jacques Litteaut, Marly le Roy (FR); Jean-François Rey, Brest (FR)

(73) Assignee: Alcatel Lucent, Paris (FR)

( * ) Notice: Subject to any disclaimer, the term of this patent is extended or adjusted under 35 U.S.C. 154(b) by 738 days.

(21) Appl. No.: 12/489,784

(22) Filed: Jun. 23, 2009

(65) Prior Publication Data

US 2009/0323917 A1 Dec. 31, 2009

(51) Int. Cl.
*H04M 3/42* (2006.01)

(52) U.S. Cl.
USPC .............................. 379/207.02; 379/201.01

(58) Field of Classification Search
USPC .............. 379/207.02, 201.01, 201.03, 201.05
See application file for complete search history.

(56) References Cited

U.S. PATENT DOCUMENTS

| | | | |
|---|---|---|---|
| 6,097,792 | A | 8/2000 | Thornton |
| 6,556,997 | B1 * | 4/2003 | Levy ..................................... 1/1 |
| 6,757,530 | B2 * | 6/2004 | Rouse et al. ............... 455/412.1 |
| 7,548,951 | B2 | 6/2009 | Nagayama et al. |
| 7,676,544 | B2 | 3/2010 | Murakami et al. |
| 2002/0095462 | A1 | 7/2002 | Beck et al. |
| 2003/0005066 | A1 | 1/2003 | Lazaridis et al. |
| 2003/0233247 | A1 | 12/2003 | Liu et al. |
| 2003/0235282 | A1 * | 12/2003 | Sichelman et al. ...... 379/201.03 |
| 2007/0168192 | A1 * | 7/2007 | Peuziat et al. ................ 704/260 |
| 2009/0248422 | A1 * | 10/2009 | Li et al. ......................... 704/277 |

FOREIGN PATENT DOCUMENTS

| | | |
|---|---|---|
| JP | 57-123758 | 8/1982 |
| JP | 05-244275 | 9/1993 |
| JP | 2002-252708 | 9/2002 |
| JP | 2004-054822 | 2/2004 |
| JP | 2005-012339 | 1/2005 |
| JP | 2005-192024 | 7/2005 |
| JP | 2005-244524 | 9/2005 |
| JP | 2006-074198 | 3/2006 |
| JP | 2006-074689 | 3/2006 |
| JP | 2007-166018 | 6/2007 |

OTHER PUBLICATIONS

French Search Report.
English Abstract of JP 57-123758.
English Abstract of JP 05-244275.

(Continued)

*Primary Examiner* — William Deane, Jr.
(74) *Attorney, Agent, or Firm* — Fay Sharpe LLP

(57) ABSTRACT

The invention pertains to a method for retrieving at least one piece of information regarding a telephone communication between at least two telephone terminals (2, 3) belonging to different users (20, 30) via a communication server (1), from at least one of the telephone terminals (2, 3). The invention further pertains to the corresponding communication server (1). The inventive information retrieval method comprises the steps of the communication server detecting the closing of communication by one of the users (20, 30) and the communication server (1) activating, for at least one of the users, an information retrieval service (1). The retrieval service comprises, for each of the users (20, 30) for which it is activated, the steps of selecting a form based on a criterion, submitting the form to the user (20, 30), and transmitting the completed form, along with said at least one piece of information, to a database (4).

15 Claims, 2 Drawing Sheets

(56) References Cited

OTHER PUBLICATIONS

Figure 1:
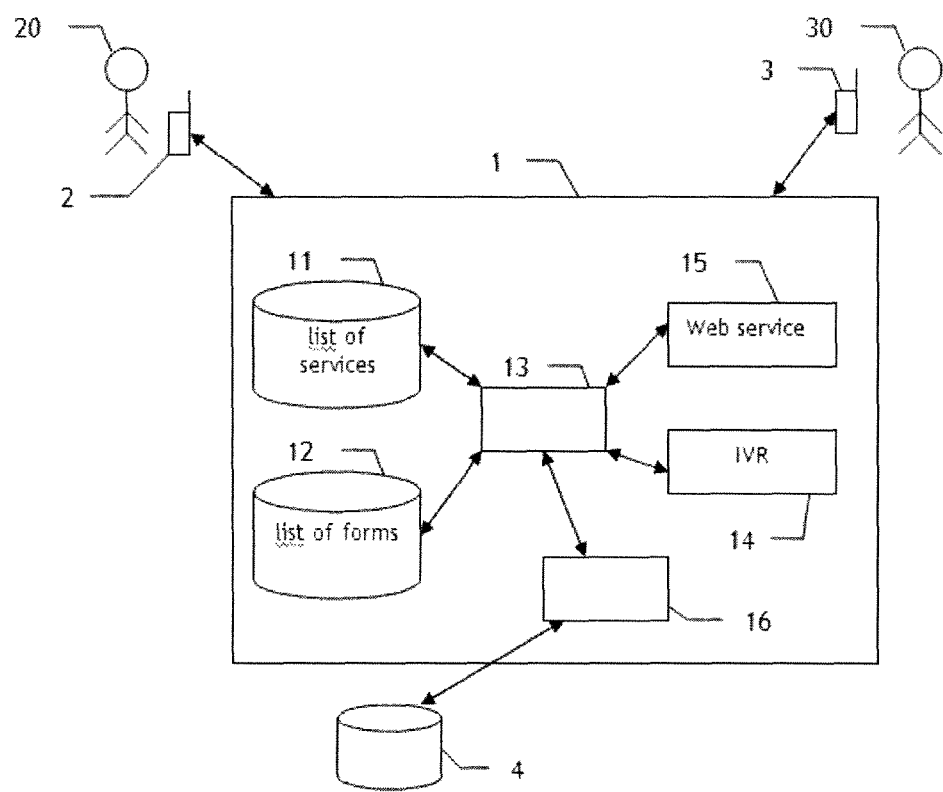

English Abstract of JP 2002-252708.
English Abstract of JP 2004-054822.
English Abstract of JP 2005-012339.
English Abstract of JP 2005-192024.
English Abstract of JP 2005-244524.
English Abstract of JP 2006-074198.
English Abstract of JP 2006-074689.
English Abstract of JP 2007-166018.
Official Action issued in connection with Japanese Patent Application No. 2011-515360; Mailing Date: Oct. 30, 2012; w/ Translation.
French Search Report, Mar. 10, 2009.

* cited by examiner

METHOD FOR RETRIEVING INFORMATION FROM A TELEPHONE TERMINAL VIA A COMMUNICATION SERVER, AND ASSOCIATED COMMUNICATION SERVER

This invention pertains to the field of managing information exchanged during telephone communications. It pertains in particular to a method for retrieving at least one piece of information from at least one of the telephone terminals of at least two users communicating via a communication server.

During telephone communications, the speakers commonly exchange information that may be useful to both of them after the communication has ended. Among other things, during business telephone calls, it is not uncommon for a certain number of tasks or actions to be assigned to one of the speakers.

In order to be able to track the progress of the tasks assigned to him, or so as not to forget the information transmitted to him during the communication, a speaker generally records this information into a personal organizer, or into a to-do list. Although paper-based organizers are still used, speakers conventionally record the information into task organizer applications. In particular, these applications consist of electronic organizers implemented on PDAs or in the form of notebook features offered by e-mail clients, such as Outlook®, installed on the speakers' personal or work computers.

However, the speaker is not always able to access his task organizer applications in order to therein enter any relevant information which may have been transmitted to him during the communication.

Indeed, numerous telephone terminals are not equipped with electronic organizers, and it is not uncommon for the speakers not to be in the vicinity of their computers when they receive or send a communication. Thus, the speaker cannot record the information into his organizer or to-do list before returning to his desk, where he can access an application that can communicate to him information about his use of time.

A similar situation occurs whenever a speaker wishes to record various information communicated during the telephone conversation into electronic data entry files or collaborative applications installed on or shared by the speaker's personal or work computer.

However, the more time passes between the end of the telephone call and the input of information into an application, the greater the chance will be that the user will forget the information which was transmitted to him or the tasks which were assigned to him during the call.

This invention aims to reduce the risk of losing information, by enabling the user to retrieve whatever information he may deem relevant from his telephone terminal after communication has ended.

To this end, a first object of the invention pertains to a method for retrieving at least one piece of information regarding a telephone communication between at least two telephone terminals belonging to different users via a communication server, from at least one of the two telephone terminals, said method comprising the successive steps of:
the communication server detecting the ending of the communication by one of the users;
the communication server activating, for at least one of the users, an information retrieval service;
said retrieval service comprising, for each of the users for which it has been activated, the following steps:
selecting a retrieval form from a list of previously saved retrieval forms, based on at least one criterion;
submitting the selected retrieval form to the user; and
transmitting the retrieval form completed by the user with said at least one piece of information to a database.

Advantageously, said at least one criterion is a technical characteristic of said telephone terminal. In this manner, the selected form is adapted to the telephone terminal, and may therefore be submitted and completed correctly by the user.

As a variant or in combination, said at least one criterion is a previously saved preference of the user. Taking the user's preferences into account enables the selection of a form which is definitely suited to the type of information that the user wishes to retrieve.

Advantageously, the retrieval service further comprises a step of creating a task based on the completed retrieval form, said task then being transmitted, during the transmission step, to a database of a task organizer application. This step makes it possible to automatically update the data of the user's electronic organizer based on the information retrieved using the completed form.

A second object of the invention pertains to a communication server with which telephone communication is established between at least two telephone terminals respectively belonging to at least two users, characterized in that said communication server is capable of detecting the closing of the communication by one of the users and to activate a retrieval service for retrieving at least one piece of information regarding said telephone communication for at least one of the users, and in that said communication server comprises, for the fulfillment of said retrieval service:
selection means enabling the selection of a retrieval form based on at least one criterion;
submission means enabling the submission of said retrieval form to the user and the retrieval of said completed form with said at least one information; and
transmission means enabling the transmission of the completed retrieval form to the database.

Figure 2:
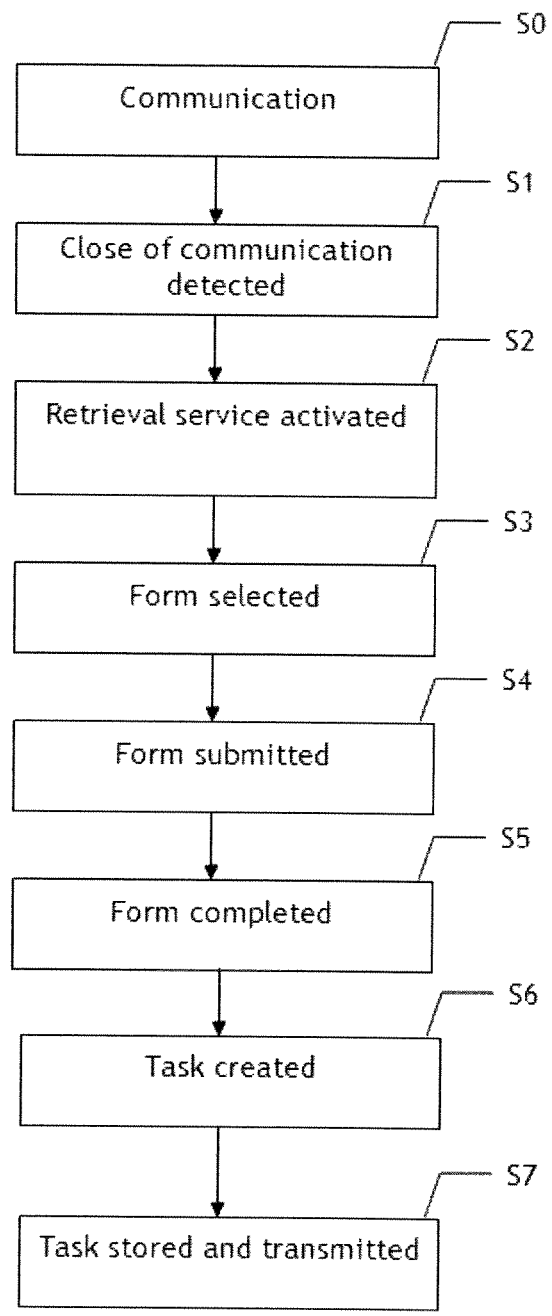

Other characteristics and benefits of the invention will become apparent upon reading the following description, with reference to the attached drawings, in which:

FIG. 1 schematically depicts a preferred architecture of a communication server enabling the retrieval of at least one piece of information in accordance with the invention;

FIG. 2 depicts various steps regarding the creation of a task following the retrieval of at least one piece of information, in the form of a flowchart.

As shown in FIG. 1, a communication server 1 makes it possible for telephone communication to take place between multiple telephone terminals 2, 3 which respectively belong to different users 20, 30.

Conventionally, the communication server 1 is fit to implement a certain number of call management services; the various services may be present in a service database 11. The communication server 1 is also capable of creating and maintaining communication tracking files comprising data such as, among other things, the duration of the communication, the number of participants, and the numbers and/or addresses of the terminals 2, 3 between which communication takes place.

According to the inventive method, whenever one of the speakers 20, 30 ends the communication, the communication server 1 detects the closing of communication and activates an information retrieval service. The information retrieval service may be activated by the speaker 20, 30 who closed the communication, and/or also for a speaker 20, 30 who remains connected to the communication server 1.

The retrieval service, for each of the users 20, 30 (each of the speakers who took part in the communication), comprises a first step of selecting a retrieval form from a list of previously saved forms based on at least one criterion. Such a criterion may consist in a technical characteristic of the telephone terminal 2, 3 used to carry out the communication. As a variant or in combination, the criterion may also consist in a previously saved preference of the user 20, 30.

Once the appropriate form has been selected, a step of submitting the form to the user 20, 30 takes place. The retrieval form is submitted by means of the telephone terminal 2, 3. The form may be submitted by voice. Alternatively, the form is submitted by being displayed on the telephone terminal 2, 3.

Next, the user 20, 30 then completes the retrieval form with at least one piece of information that he has exchanged and deemed relevant during the communication. Afterward, the retrieval form completed by the user 20, 30 with the information to be retrieved is transmitted to a database 4. The retrieved information may then be checked by the user 20, 30 after the communication is over, once an application with access to the database 4 is available to that user.

With reference to FIGS. 1 and 2, the various features of the communication server 1 as well as the various steps implemented to retrieve at least one piece of information will be described in detail.

As shown in FIG. 2, two speakers 20, 30 communicate by means of their respective telephone terminals 2, 3. The telephone terminals 2, 3 may be mobile telephones, conventional telephony terminals, or terminals adapted to establish voice-over-IP telephone communication.

Communication between the telephone terminals is established via a communication server 1 (Step S0 in FIG. 2).

When one of the speakers 20, 30 decides to leave the communication, he disconnects (hangs up) from the communication server 1. According to the inventive method, the communication server 1 then detects that one of the speakers 20, 30 of the communication has ended communication (Step S1 in FIG. 2) and triggers the information retrieval service found in its service database 11 (Step S2 in FIG. 2).

Once triggered, the information retrieval service checks the communication tracking file regarding the communication between the speakers 20, 30. The retrieval service then possesses a set of communication characteristics, which particularly include the speaker 20, 30 who initiated communication (the calling party), the speaker who was called, the speaker who ended the communication, and the numbers and/or addresses of the different terminals 2, 3 used during said communication.

Depending on how the information retrieval service is configured within the communication server 1, the service may be activated for all of the speakers of the communication, or just for the calling party or the called party.

Advantageously, the communication server comprises a list of users 20, 30 for whom the retrieval service has been activated. In this manner, whenever the communication server 1 detects the end of a communication, it activates the information retrieval service for all of the users who participated in the communication and are on the list.

For each of the users 20, 30 for which it is activated, the information retrieval service triggers an application 13 in order to submit a form, and to retrieve the form once it has been completed by the user 20, 30.

This application may be implemented on each of the terminals 2, 3. It may also be centralized within the communication server 1.

More precisely, if the application 13 is centralized within the communication server 1, said server selects a retrieval form from a list of retrieval forms previously saved in a database 12 found on the communication server 1 (Step S3 in FIG. 2).

Advantageously, the various forms on the list will have been created when the communication server 1 was initialized by an administrator of the server 1. Each form may comprise an indication regarding the technical characteristics that a telephone terminal 2, 3 must possess, as well as the features that must be installed on the communication server 1 so that the form can be submitted and completed correctly by the user 20, 30.

By way of example, when the form is an VXML (Voice XML) file intended to be submitted to a user by voice, an indication may then be provided stating both that the telephone terminal 2, 3 must be capable of interacting with the communication server using a DTMF (Dual Tone Multi Frequency) function, and that the communication server 1 must be equipped with an interactive voice server 14. Such a voice server is conventionally known as an IVR unit (Interactive Voice Response Unit).

Likewise, if the form is an XML or HTML file intended to be graphically submitted to the user 20, 30, it may be helpful to state that the telephone terminal 2, 3 must possess a graphical interface capable of displaying such a form.

In this manner, once triggered, the application 13 checks the communication tracking file in order to determine the type of telephone terminal 2, 3 of the user 20, 30 for whom the retrieval service was activated. Once the type of terminal 2, 3 has been identified, the application is capable of selecting a retrieval form based on at least one technical characteristic of the telephone terminal 2, 3.

Advantageously, the communication server 1 further contains preferences regarding the users. If so, the application 13 selects a form based on at least one of the user's 20, 30 preferences. These preferences may be saved in the aforementioned list of users 20, 30 for whom the retrieval service may be activated. These preferences may consist of details regarding the nature of the submission (voice or visual) by which the user 20, 30 wishes to have the form submitted.

Advantageously, each user has created his own forms. In this manner, when the form is submitted, the user 20, 30 will be able to more quickly and more effectively complete the form with the information to be retrieved. Indeed, because the user had created the form himself, he will know, if it is a voice form, the series of questions that he will need to answer, and if it is a graphical form, the location of the fields to fill in.

Once the retrieval form has been selected, the application 13 triggers the various modules 14, 15 of the communication server 1 needed to submit the form.

More precisely, whenever the retrieval service is activated for a user 20, 30 who has ended the communication, the application 13 triggers a call from the terminal 2, 3 of the user 20, 30 by the communication server 1 in order to establish a new communication channel between these two devices. The retrieval form is then submitted during this subsequent communication, established between the communication server 1 and the telephone terminal 2, 3 of the user 20, 30.

On the other hand, whenever the retrieval service is activated for a user 20, 30 who has remained connected to the communication server, the retrieval form is submitted over the connection through a switchover triggered by the activation of the retrieval service.

By establishing either a new communication channel or simply switching over, the retrieval service may thereby be applied to all of the participants in the communication, whether or not they have ended communication. Consequently, none of the speakers is favored, and it is not necessary for a user to require that the person he is speaking to hang up first in order to enable the activation of the retrieval service.

Once the new communication channel has been established or the switchover has been made, the application 13 provides the form to the modules 14, 15 adapted to submit it (Step S4 in FIG. 2).

Whenever the selected form is to be submitted in voice form, the application 13 sends the selected form to an IVR unit 14, which plays the form back to the user 20, 30. The form consists of a series of questions played by the IVR on the terminal 2, 3 of the user 20, 30. The first question of the form particularly consists of offering the retrieval service to the user 20, 30. That user has the option of accepting or refusing the form. If it is refused, the retrieval service ends, and the connection between the communication server 1 and the user's telephone terminal 2, 3 is freed up.

If it is accepted, the form's questions are addressed vocally to the user 20, 30, one after another. This user may answer the questions by means of the keyboard of his telephone terminal 2, 3. If so, the retrieval form is completed (Step S5 in FIG. 2) by the user, using a DTMF function.

The user may also answer the questions by speaking the answers into the handset of his telephone terminal 2, 3. If so, the retrieval form is completed (Step S5 in FIG. 2) by the user using voice recognition.

Advantageously, certain questions may be left unanswered by the user 20, 30. This user may also decide to halt the series of questions before the entire form has been played. This option may be exercised by using a particular key combination, if a DTMF function is being used. The form may also be stopped early following the recognition of the word "stop" spoken by the user 20, 30.

Alternatively, when the selected form is to be submitted graphically, the application 13 transmits the selected form to a Web service which transmits the form to the terminal 2, 3. The form is then submitted to the user 20, 30 on the graphical interface of the terminal 2, 3.

If the user 20, 30 accepts the form submit to him, he fills in (Step S5 in FIG. 2) the fields of the form which have been left empty using a keyboard or another graphical interface module found on his terminal 20, 30. Advantageously, it is not necessary for the user 20, 30 to fill in all of the empty fields of the form before resending it to the communication server 1.

Once the form is completed in whole or in part by the user 20, 30, the application 13 sends it to an interface module 16. The interface module 16 then sends it to a database 4 in which it will be stored (Step S7 in FIG. 2). The user 20, 30 may then subsequently consult the info ration which was retrieved using the retrieval service.

Advantageously, the communication recording saved by the communication server 1 is attached to the completed retrieval form and is also transmitted to the database 4. This combination may prove particularly beneficial, as the retrieval form needs to be short in order to minimize the time taken to run the retrieval service, and consequently, the information retrieved using the completed form is concise. Thus, when the information is checked afterward, the user 20, 30 may complete it by listening to the recording of the telephone communication.

Advantageously, the interface module 16 creates a task derived from the completed retrieval form (Step S6 in FIG. 2). The task thereby created is then transmitted to the management database 4, which is the same as the database of a task organizer application (Step S7 in FIG. 2). Thus, the user's electronic organizer, whether it is directly connected to or may be synchronized with the information contained in the database 4, is automatically updated. The task created by the retrieval service after the telephone communication then appears in the electronic organizer of the user 20, 30.

The task may also consist of creating an e-mail to be sent to the e-mail server of the user 20, 30. Thus, after the information is retrieved by the retrieval service, the user 20, 30 will automatically receive a new message in his e-mail inbox containing the essential information exchanged during the telephone conversation.

Although the various characteristics and advantages of the invention have been described with reference to communication involving only two users and to an application 13 plus a list of retrieval forms incorporated into the communication server 1, the invention is not limited to such an embodiment. The inventive method may be applied whenever communication between more than two speakers is carried out from more than two telephone terminals via the communication server. Furthermore, each terminal 2, 3 may further comprise such an application and such forms. In such an embodiment, the retrieval service triggers the application 13 present in each of the telephone terminals 2, 3 of the users 20, 30 who participate in the communication. The completed form may then be transmitted to the database 4 directly from the telephone terminal 2, 3, or by means of the communication server 1.

The invention claimed is:

1. A method for retrieving at least one piece of information regarding a telephone communication between at least two telephone terminals belonging to different users via a communication server, from at least one of the two telephone terminals, which method comprises the steps of:

the communication server detecting the ending of the communication by one of the users;

the communication server activating an information retrieval service for at least one of the users in response to detecting the ending of the communication by one of the users;

said retrieval service comprising, for each of the users for which it has been activated, the following steps:

selecting a retrieval form from a list of previously saved retrieval forms, based on at least one criterion;

submitting the selected retrieval form to the user;

transmitting the retrieval form completed by the user along with said at least one piece of information, to a database.

2. The method according to claim 1, wherein said at least one criterion is a technical characteristic of said telephone terminal.

3. The method according to claim 1, wherein said at least one criterion is a previously saved preference of the user.

4. The method according to claim 1, wherein said retrieval service further comprises a step of creating a task based on the completed retrieval form, said task then being transmitted, during the transmission step, to a database of a task organizer application.

5. The method according to claim 1, wherein, with the retrieval service having been activated for a user who closed said communication, said submission of said retrieval form is carried out during a later communication established between the communication server and the telephone terminal of said user who had closed the communication.

6. The method according to claim 1, wherein, with the retrieval service having been activated for a user who remained connected to said communication server, said submission of the retrieval form is carried out over said connection by a switchover triggered by activating the retrieval service.

7. The method according to claim 1, wherein said submission of the retrieval form to said user is carried out by voice.

8. The method according to claim 7, wherein said retrieval form consists of a VXML file.

9. The method according to claim 7, wherein said retrieval form is completed by said user using a DTMF function.

10. The method according to claim 7, wherein the retrieval form is completed by said user using a voice recognition function.

11. The method according to claim 1, wherein said submission of the retrieval form to said user is carried out by displaying said form on the telephone terminal of said user, and in that said retrieval form is completed by said user using a graphical interface module of said telephone terminal.

12. The method according to claim 11, wherein said retrieval form consists of a XML or HTML file.

13. A communication server via which a telephone communication is established between at least two telephone terminals respectively belonging to at least two users, said communication server compromising:

an application that selects a retrieval form based on at least one criterion;

at least one module that submits the selected retrieval form to at least on of the user and retrieves a completed form therefrom with at least one piece of information regarding the telephone communication; and an interface that transmits the completed retrieval form to a database;

wherein said communication server activates a retrieval service to retrieve the at least one piece of information regarding said telephone communication from the at least one of the users in response to detecting a closing of the telephone communication by one of the users.

14. The communication server according to claim 13, wherein said at least one criterion is a characteristic of the telephone terminal of the user or a previously saved preference of the user.

15. The communication server according to claim 13, wherein the interface is operable to create a task based on said completed retrieval form and transmit said task to a database of a task organizer application.

* * * * *